US012744222B2

(12) United States Patent
Lee et al.

(10) Patent No.: US 12,744,222 B2
(45) Date of Patent: Sep. 22, 2026

(54) ELECTROCHEMICAL CATALYST OF CORE-SHELL STRUCTURE AND MANUFACTURING METHOD THEREOF

(71) Applicant: KOREA INSTITUTE OF SCIENCE AND TECHNOLOGY, Seoul (KR)

(72) Inventors: Albert Lee, Seoul (KR); Seung Sang Hwang, Seoul (KR); Seon Joon Kim, Seoul (KR); Taegon Oh, Seoul (KR); Ji Yoon Jung, Seoul (KR); Young Sang Park, Seoul (KR); Dong Jun Hwang, Seoul (KR); Gwan Hyun Choi, Seoul (KR)

(73) Assignee: KOREA INSTITUTE OF SCIENCE AND TECHNOLOGY, Seoul (KR)

(*) Notice: Subject to any disclaimer, the term of this patent is extended or adjusted under 35 U.S.C. 154(b) by 465 days.

(21) Appl. No.: 18/503,585

(22) Filed: Nov. 7, 2023

(65) Prior Publication Data

US 2024/0204208 A1 Jun. 20, 2024

(30) Foreign Application Priority Data

Nov. 25, 2022 (KR) ........................ 10-2022-0160498

(51) Int. Cl.

| | |
|---|---|
| ***H01M 4/86*** | (2006.01) |
| ***H01M 4/90*** | (2006.01) |
| ***H01M 4/92*** | (2006.01) |
| ***H01M 8/1004*** | (2016.01) |

(52) U.S. Cl.

CPC ....... *H01M 4/8657* (2013.01); *H01M 4/9008* (2013.01); *H01M 4/928* (2013.01); *H01M 8/1004* (2013.01); *H01M 2004/8689* (2013.01)

(58) Field of Classification Search

CPC .. H01M 4/8657; H01M 4/9008; H01M 4/928; H01M 4/9091; H01M 4/8892

See application file for complete search history.

(56) References Cited

U.S. PATENT DOCUMENTS

| | | | | |
|---|---|---|---|---|
| 2020/0058944 | A1* | 2/2020 | Song ..................... | H01M 4/921 |
| 2020/0365910 | A1* | 11/2020 | Slack .................. | H01M 4/8896 |
| 2023/0096685 | A1 | 3/2023 | Nakazawa et al. | |

FOREIGN PATENT DOCUMENTS

| | | | |
|---|---|---|---|
| CN | 113842946 | A | 12/2021 |
| KR | 10-2015-0103864 | A | 9/2015 |
| KR | 10-1808304 | B1 | 12/2017 |
| KR | 20180062213 | * | 6/2018 |
| KR | 10-2020-0025769 | A | 3/2020 |
| KR | 10-2022-0073190 | A | 6/2022 |

(Continued)

OTHER PUBLICATIONS

KR20180062213 English translation. Kim et al. Korea. Jun. 8, 2018. (Year: 2018).*

(Continued)

*Primary Examiner* — Christopher P Domone

(57) ABSTRACT

The present specification discloses an electrochemical catalyst of core-shell structure and manufacturing method thereof. The electrochemical catalyst according to one embodiment of the disclosure provides an effect of being stable in an alkaline environment that is not lost in an aqueous solution while having a high ion exchange capacity and a method for preparing the same.

11 Claims, 11 Drawing Sheets

(56) References Cited

FOREIGN PATENT DOCUMENTS

WO 2021/177431 A1 9/2021

OTHER PUBLICATIONS

Written Decision on Registration for Korean Patent Application No. 10-2022-0160498, dated Aug. 18, 2025.
Xian Liang et al. "Ionomer Cross-Linking Immobilization of Catalyst Nanoparticles for High Performance Alkaline Membrane Fuel Cells," Chemistry of Materials, 2019, pp. 7812-7820, vol. 31.
Yongjun Leng et al. "Alkaline membrane fuel cells with in-situ cross-linked ionomers," Electrochimica Acta, 2015, pp. 93-100, vol. 152.
Chanyeon Kim et al. "Tailored catalyst microenvironments for $CO_2$ electroreduction to multicarbon products on copper using bilayer ionomer coatings," Nature Energy, Nov. 2021, pp. 1026-1034, vol. 6.
Dongguo Li et al. "Highly quaternized polystyrene ionomers for high performance anion exchange membrane water electrolysers," Nature Energy, May 2020, pp. 378-385, vol. 5.

* cited by examiner

*TAMPB*

*TAAB*

Sonication
& crosslinking

High IEC Interlayer
coating

ELECTROCHEMICAL CATALYST OF CORE-SHELL STRUCTURE AND MANUFACTURING METHOD THEREOF

CROSS REFERENCE TO RELATED APPLICATION

The present application claims priority to Korean Patent Application No. 10-2022-0160498, filed Nov. 25, 2022, the entire contents of which is incorporated herein for all purposes by this reference.

BACKGROUND OF THE INVENTION

Field of the Invention

The present specification discloses an electrochemical catalyst of core-shell structure and manufacturing method thereof.

Description of the Related Art

This invention was made with the support of the Ministry of Science and ICT under Project No. 1711156125, which was conducted under the research project entitled "Development of reactive nano-composite filters for hazardous wastes from semiconductor/electronic industry" within the project named "Nano Material Technology Development" under the management of the National Research Foundation of Korea, from Jan. 1, 2022 to Dec. 31, 2022.

This invention was made with the support of the Ministry of Science and ICT under Project No. 1711154756, which was conducted under the research project entitled "Development of Multifunctional Micro LED transfer and encapsulation materials" within the project named "Nano Material Technology Development" under the management of the National Research Foundation of Korea, from Jan. 1, 2022 to Dec. 31, 2022.

This invention was made with the support of the Ministry of Science and ICT under Project No. 1711175402, which was conducted under the research project entitled "Solutions to Electromagnetic Interference in Future-mobility" within the project named "Support for research and operation expenses of the National Research Council of Science and Technology" under the management of the National Research Council of Science and Technology, from May 1, 2022 to Dec. 31, 2022.

Renewable energy is in the limelight due to depletion of fossil fuels and climate change, and electrolysis technology for producing hydrogen using electricity from renewable energy is being used. Hydrogen is a very useful raw material and can be used as a fuel for many types of fuel cells. Electrolysis is classified into three types of proton exchange membrane (PEM) water electrolysis, alkaline water electrolysis and solid oxide electrolysis cell (SOEC) water electrolysis, depending on the electrolyte membrane used therefor. Proton exchange membrane (PEM) water electrolysis and alkaline water electrolysis are operated at 60 to 80° C., and solid oxide electrolysis cell (SOEC) water electrolysis is operated at 600 to 1,000° C. Among those, the proton exchange membrane (PEM) is known to be most suitable for a system for generating hydrogen through the connection with renewable energy by virtue of its advantages of fast start, load change cycle operation capability, high-purity hydrogen generation and operation in a high current density region. However, it is required that the proton exchange membrane (PEM) uses an expensive material, such as a platinum group metal (PGM) catalyst and a titanium diffusion medium.

Due to these problems, attention has recently been focused on alkaline hydrolysis, which can be applied to non-noble metals. In this regard, Korean Patent Laid-Open Publication No. 10-2015-0103864 provides a method for preparing an electrocatalyst in alkaline water electrolysis and an electrocatalyst for alkaline water electrolysis manufactured thereby. However, the alkaline water electrolysis has a problem in that hydrogen production efficiency is lower that of the water electrolysis of proton exchange membrane (PEM) using noble metals. Accordingly, in alkaline water electrolysis using a non-noble metal catalyst, it is necessary to improve a reaction system in a high voltage section where mass transfer is restricted. In addition, in alkaline water electrolysis, performance efficiency can be enhanced by using a polymer binder or membrane with high ion exchange capacity. However, as the ion exchange capacity increases, an aqueous solubility increases, and there is a possibility that the binder may be lost due to the characteristics of the device operating while circulating the electrolyte. Accordingly, solutions to these problems are also required.

SUMMARY OF THE INVENTION

An object according to one aspect of the disclosure is to provide an electrochemical catalyst of core-shell structure stable in an alkaline environment that is not lost in an aqueous solution while having high ion exchange capacity and a method for preparing the same.

In one aspect of the disclosure, an electrochemical catalyst comprising a core comprising a catalyst particle; a first shell comprising a cationic organic polymer coated on the core; and a second shell comprising an ionomer coated on the first shell, wherein the cationic organic polymer is a nitrogen-containing organic polymer is provided.

In another aspect, the disclosure provides a hydrogen electrode comprising the electrochemical catalyst.

In one aspect, the disclosure provides a membrane electrode assembly comprising a cathode electrode comprising the electrochemical catalyst; an anode electrode positioned opposite to the cathode electrode; and an electrolyte membrane positioned between the cathode electrode and the anode electrode.

In another aspect, the disclosure provides a water electrolysis device comprising the membrane electrode assembly.

In another aspect, the disclosure provides a fuel cell comprising the membrane electrode assembly.

In another aspect, the disclosure provides a method for manufacturing the electrochemical catalyst, comprising the steps of mixing a catalyst particle, a monomer of a cationic organic polymer and a crosslinking agent to obtain a mixture; ultrasonicating the mixture to crosslink the cationic organic polymer on the catalyst particle; heat-treating and centrifuging the mixture to obtain an electrochemical catalyst precursor; and coating an ionomer on the electrochemical catalyst precursor to obtain an electrochemical catalyst.

The electrochemical catalyst according to one embodiment of the disclosure provides an effect of being stable in an alkaline environment that is not lost in an aqueous solution while having a high ion exchange capacity.

DETAILED DESCRIPTION OF THE INVENTION

Figure 1:
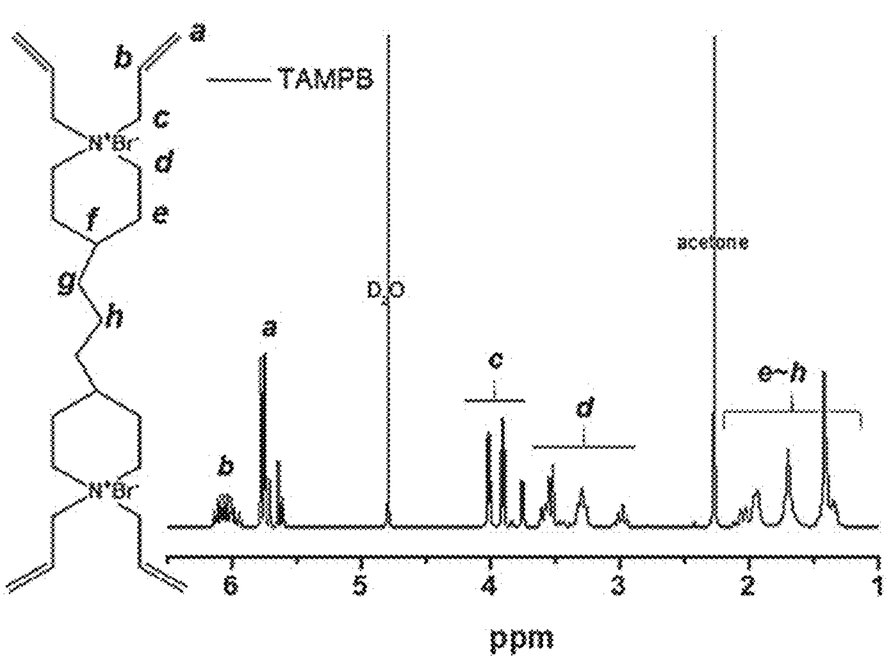
FIG. 1, FIG. 2, FIG. 3, and FIG. 4 are graphs showing the analysis results of $^{1}$H-NMR spectrum of organic polymer monomers used in an electrochemical catalyst according to one embodiment of the disclosure.
Figure 2:
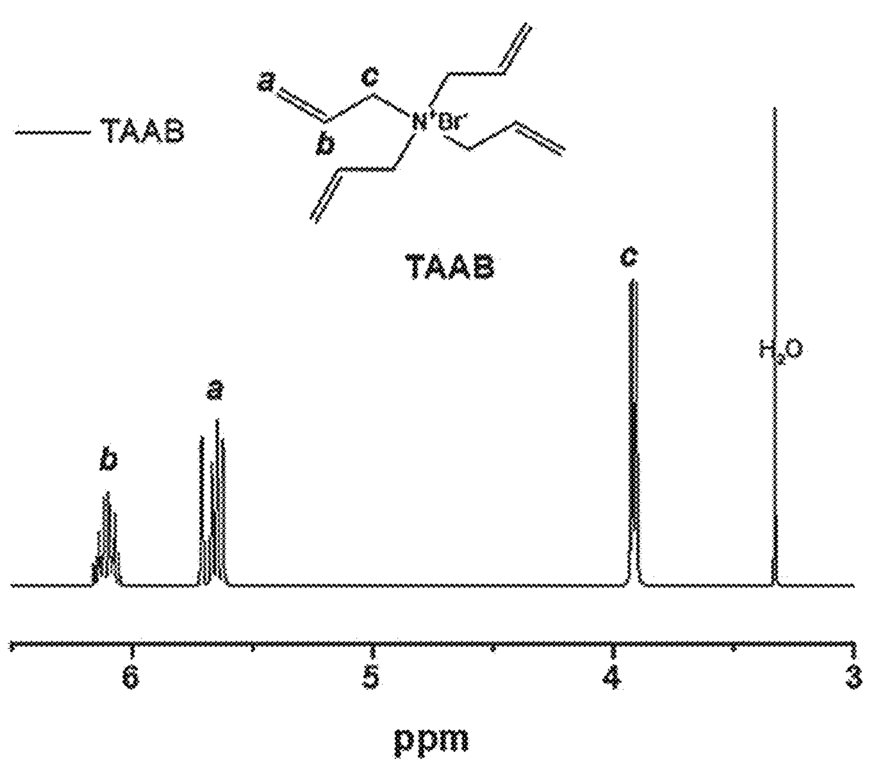
Figure 3:
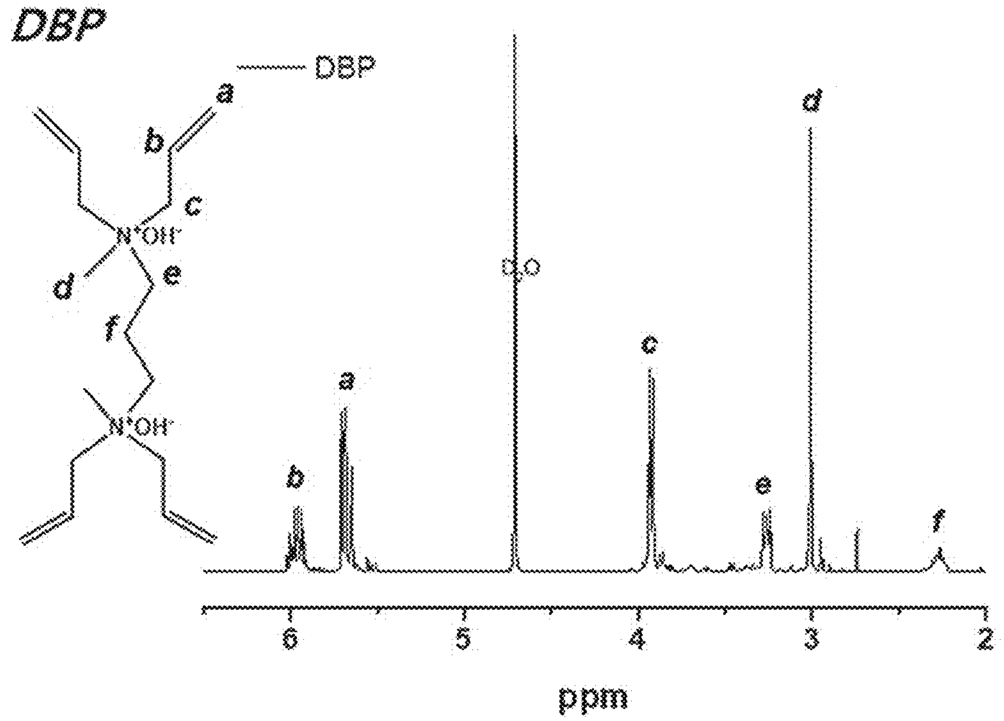
Figure 4:
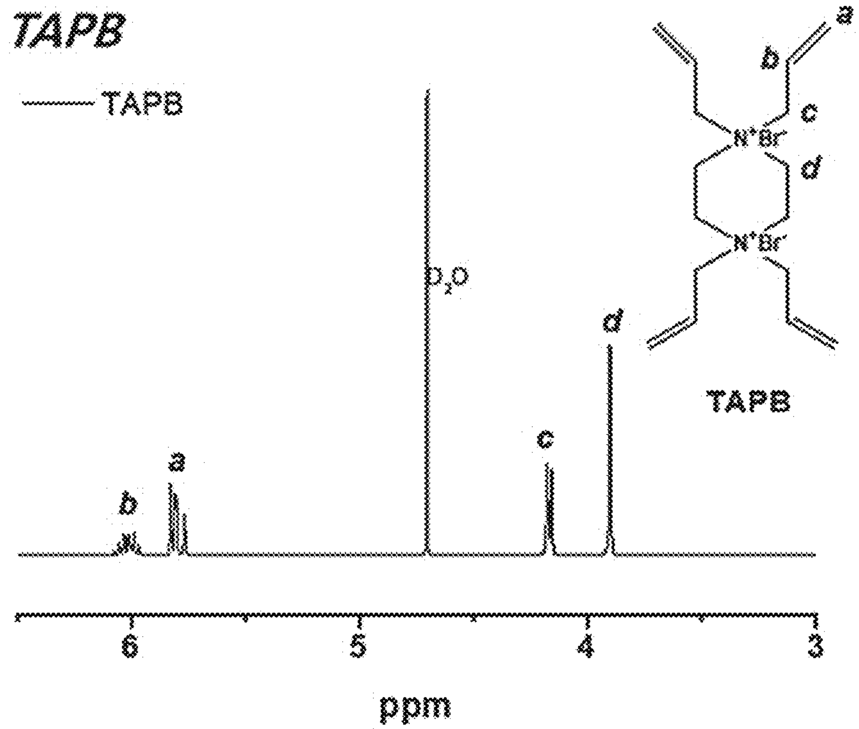
Figure 5:
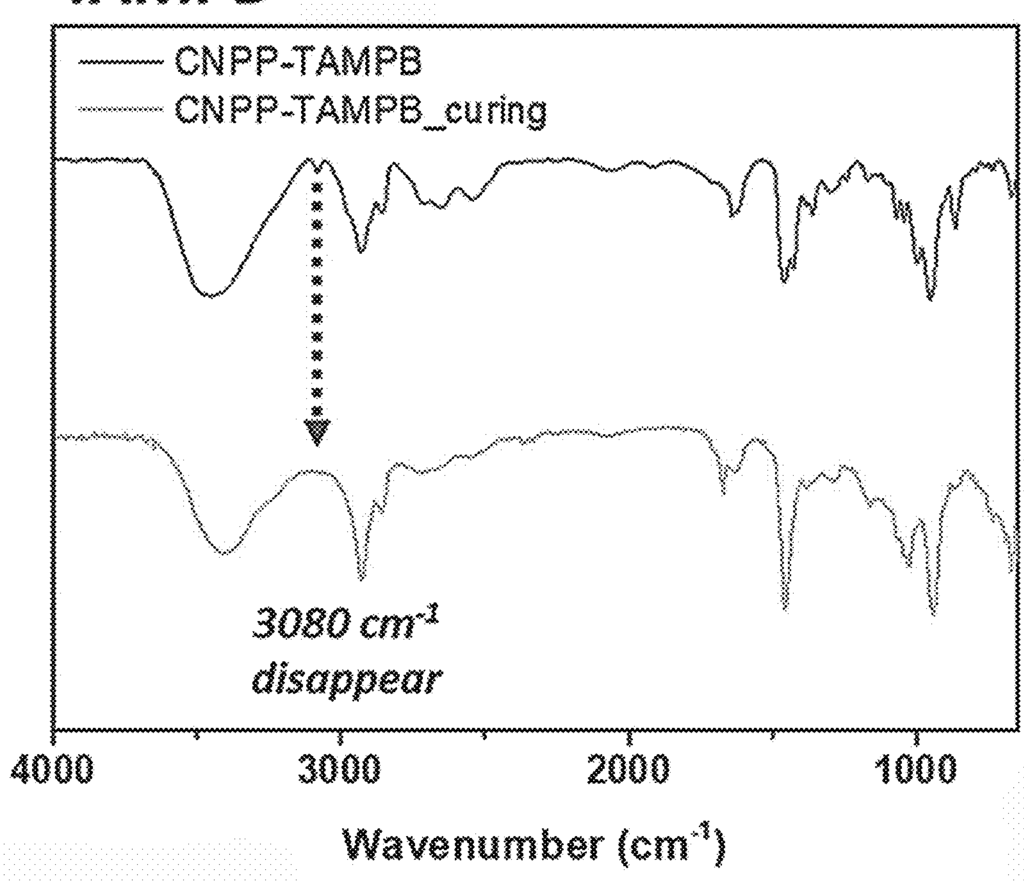
FIG. 5, FIG. 6, FIG. 7, and FIG. 8 are graphs showing FT-IR analysis results before and after crosslinking of organic polymer monomers used in an electrochemical catalyst according to one embodiment of the disclosure.
Figure 6:
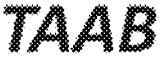
Figure 6:
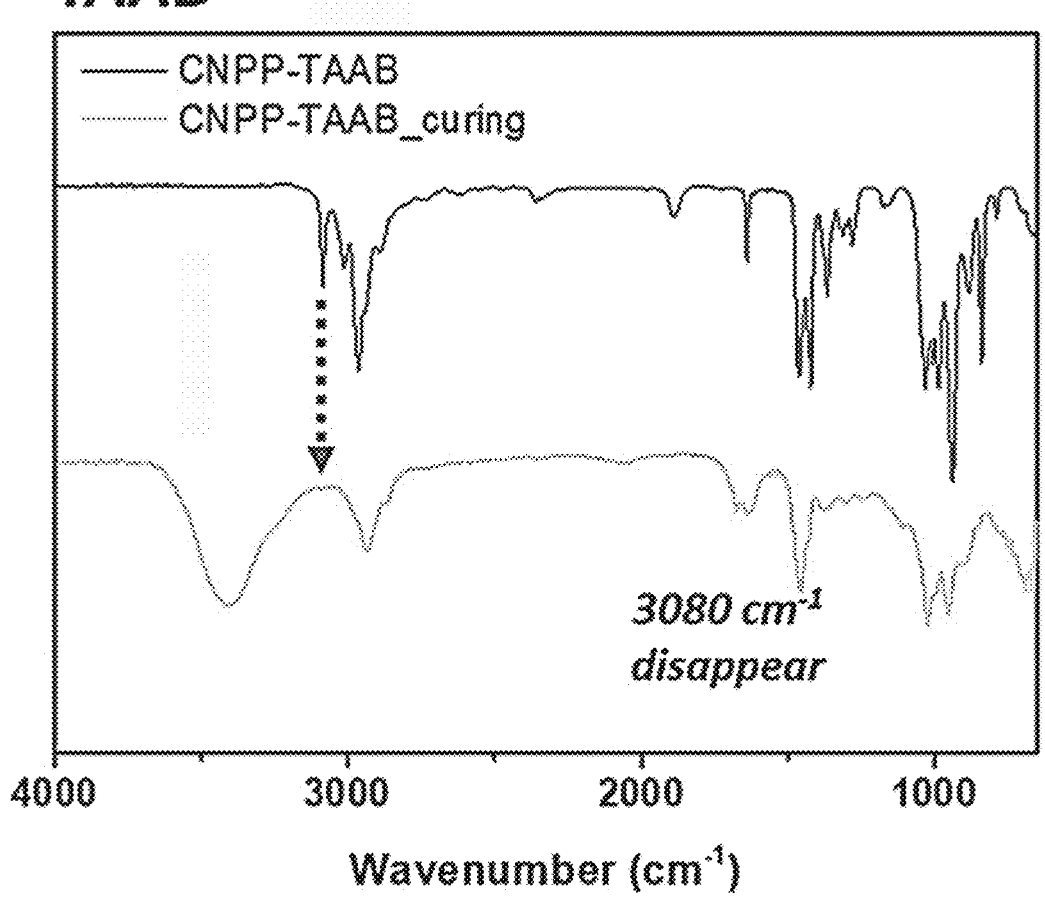
Figure 7:
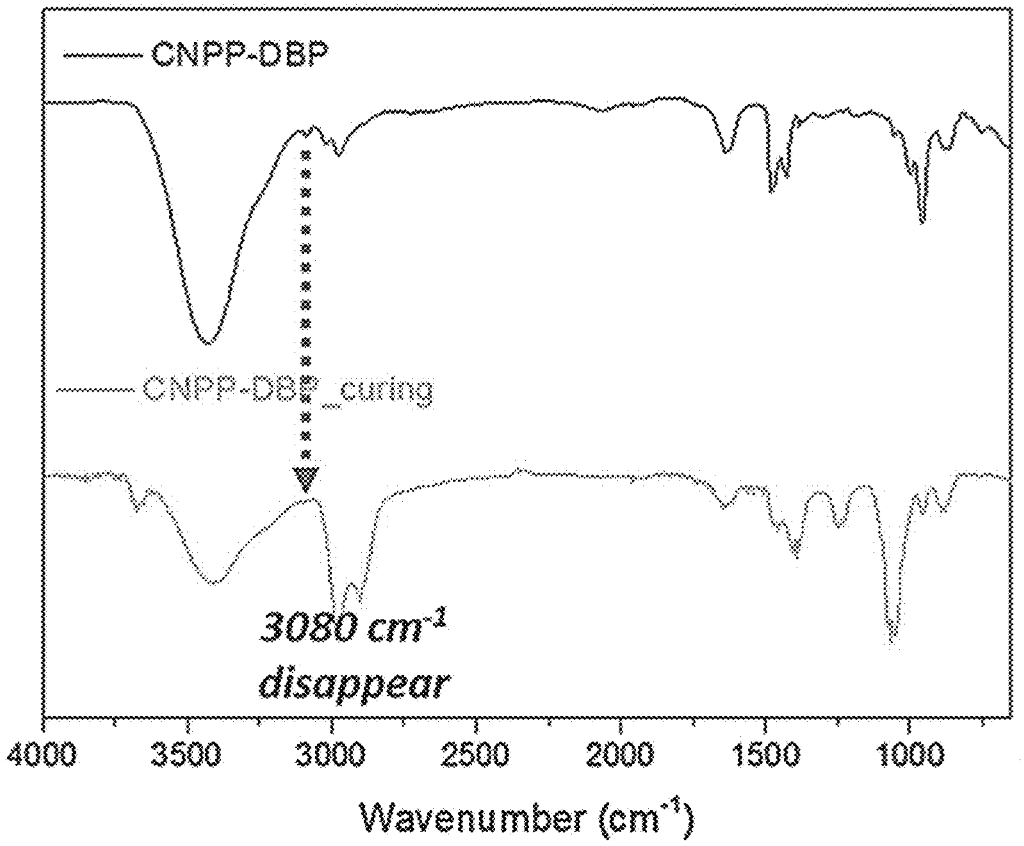
Figure 8:
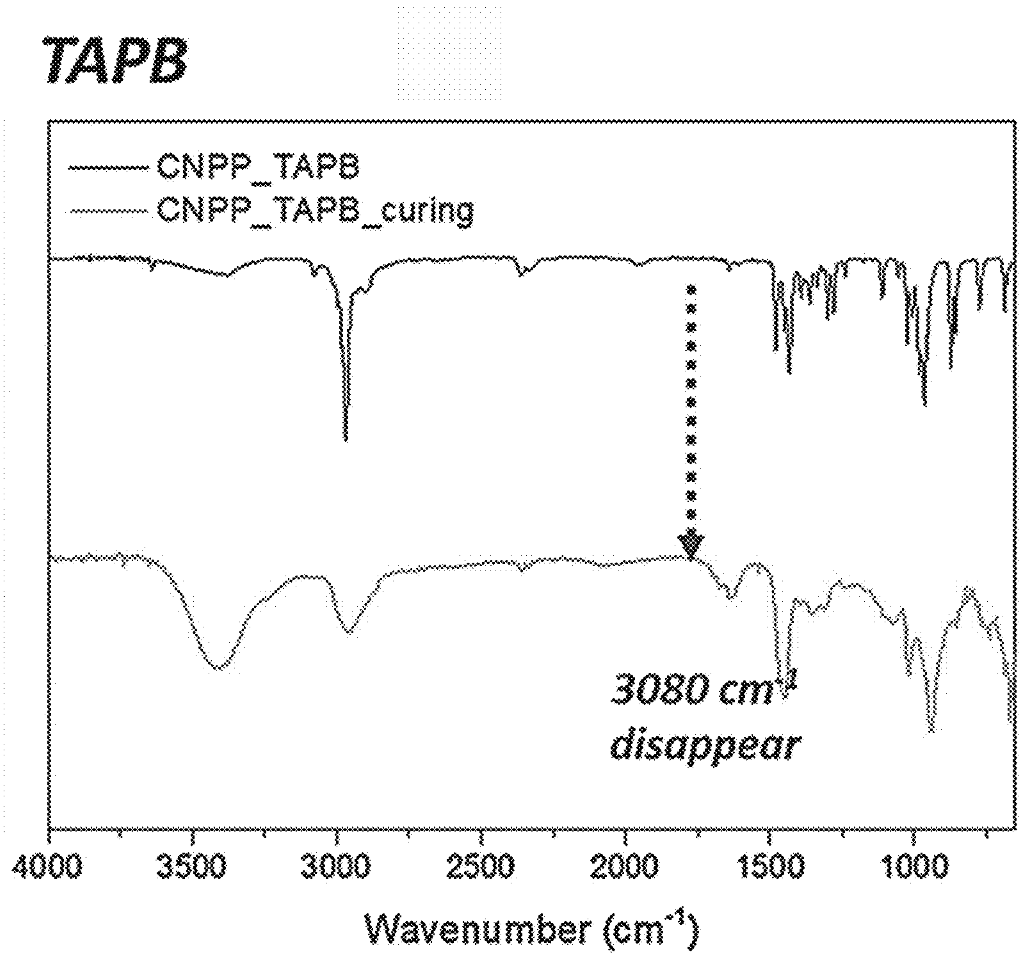

Hereinafter, preferred embodiments of the present disclosure will be described in detail with reference to the accompanying drawings.

The Examples of the present disclosure disclosed herein are exemplified for the purpose of describing the Examples of the present disclosure only, and the Examples of the present disclosure may be carried out in various forms and should not be construed to limit the Examples described herein. Since the present disclosure may have various changes and different forms, it should be understood that the Examples are not intended to limit the present disclosure to specific disclosure forms and they include all the changes, equivalents and replacements included in the spirit and technical scope of the present disclosure.

In the present specification, when one part is said to "comprise" an element, unless specifically mentioned otherwise, instead of excluding any other element, this may signify that the one part may further include other elements.

Throughout the specification, the same reference numerals designate the same components. When a component such as a layer, a film, a region, or a plate is mentioned to be placed "on" or "above" another component, it will be understood that it may be directly on another component or that another component may be interposed therebetween throughout the specification. Throughout the specification, the terms "first", "second", etc., may be used to describe various components, and should not be limited by these terms. These terms are used only to distinguish one component from another, not for purposes of limitation.

Electrochemical Catalyst

In one aspect of the disclosure, an electrochemical catalyst comprising a core comprising a catalyst particle; a first shell comprising a cationic organic polymer coated on the core; and a second shell comprising an ionomer coated on the first shell, wherein the cationic organic polymer is a nitrogen-containing organic polymer is provided.

The electrochemical catalyst may be applied to the overall electrochemical conversion reaction. Examples of the electrochemical conversion reaction may include an oxygen reduction reaction (ORR), an oxygen evolution reaction (OER), a hydrogen evolution reaction (HER), a hydrogen oxidation reaction (HOR), a carbon monoxide oxidation reaction (COR) and a methanol oxidation reaction (MOR).

The present inventors found that when forming a core-shell structure comprising a core comprising catalyst particles and a shell comprising a cationic organic polymer coated on the core, the catalyst has an excellent ion exchange capacity (IEC) and is not loss in an aqueous solution, whereby the inventors completed the invention. In particular, the inventors who recognized the problems of the prior art of coating various polymers on a catalyst layer found that excellent effects are exhibited when the polymer is coated on catalyst particles, not on the catalyst layer.

Catalyst Particles

As the type of the catalyst particle, not only noble metal catalysts such as platinum, but also non-noble metal catalysts such as nickel can be used, and are not limited thereto.

Ionomer

In one embodiment, the ionomer is one or more selected from the group consisting of a perfluorinated ionomer, a partially fluorinated ionomer, and a hydrocarbon-based ionomer.

Examples of the perfluorinated ionomer may include poly(perfluorosulfonic acid), poly(perfluorocarboxylic acid), a copolymer of tetrafluoroethylene and fluorovinylether including a sulfonic acid group, or a combination thereof, or commercially available Nafion, Flemion, Aciplex, the 3M ionomer, the Dow ionomer, the Solvay ionomer, the Sumitomo ionomer, or a mixture thereof, but are not limited thereto.

Examples of the partially fluorinated ionomer may include sulfonated poly(arylene ethersulfone-co-vinylidene fluoride), sulfonated trifluorostyrene-grafted-poly(tetrafluoroethylene) (PTFE-g-TFS), styrene-grafted sulfonated polyvinylidene fluoride (PVDF-g-PSSA), copolymers containing dicarfluorobiphenyl as a monomer, copolymers containing hexafluorobenzene as a monomer, and mixtures thereof, but are not limited thereto.

Examples of the hydrocarbon-based ionomer may include a homopolymer containing one or more hydrocarbons selected from sulfonated imide, sulfonated aryl ether sulfone, sulfonated ether ether ketone, sulfonated benzimidazole, sulfonated sulfone, sulfonated styrene, sulfonated phosphazene, sulfonated ether ether sulfone, sulfonated ether sulfone, s sulfonated etherbenzimidazole, sulfonated arylene ether ketone, sulfonated ether ketone, sulfonated styrene, sulfonated imidazole, sulfonated ether ketone ketone, aryletherbenzimidazole, and combinations thereof, alternating copolymers, random copolymers, block copolymers, multi-block copolymers, graft copolymers, and mixtures thereof, but are not limited thereto.

Cationic Organic Polymer

The cationic organic polymer is a nitrogen-containing organic polymer and does not particularly contain a phenyl group, which prevents degradation due to phenyl oxidation.

In the nitrogen-containing organic polymer, the nitrogen constitutes a part of the ammonium group. Examples of the ammonium group may include a pyridinium group, a piperidinium group, a piperazinium group, a pyrrolidinium group and an anilinium group.

According to the disclosure, by crosslinking the core comprising the catalyst particles through a monomer capable of controlling the ion exchange capacity, it is possible to overcome the limitation of not increasing the ion exchange capacity of the ionomer.

In one embodiment, the cationic organic polymer is derived from a quaternary organic salt, wherein the quaternary organic salt is a reaction product of a monomer containing two or more tertiary amine groups and a halide containing an allyl group.

The monomer containing two or more tertiary amine groups is one or more selected from the group consisting of N,N,N,N',N'-pentamethyldiethylenetriamine (PMDETA), 1,1,4,6,10,10-hexamethyltriethylenetetramine (HMTETA) and tris[2-(dimethylamion)ethyl]amine.

The N,N,N,N',N'-pentamethyldiethylenetriamine (PMDETA) may be represented by the structural formula of Formula 1 below, and the tris[2-(dimethylamion)ethyl]amine may be represented by the structural formula of Formula 2 below.

[Formula 1]

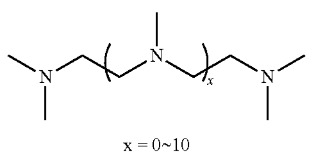

x = 0~10

[Formula 2]

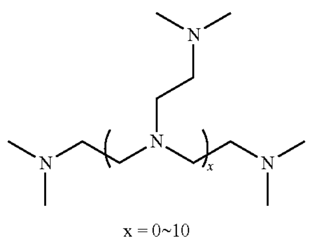

x = 0~10

In the halide containing an allyl group, examples of the halide may include fluoride compounds, chloride compounds, bromide compounds and iodine compounds. Examples of the halide containing the allyl group may include 4-bromo-1-butene represented by the structural formula of Formula 3 below and 4-vinylbenzyl bromide represented by the structural formula of Formula 4 below.

[Formula 3]

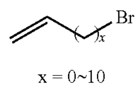

x = 0~10

[Formula 4]

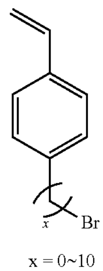

x = 0~10

The reaction of the monomer containing two or more tertiary amine groups and the halide containing an allyl group may be carried out through a process shown in Scheme 1 below.

[Scheme 1]

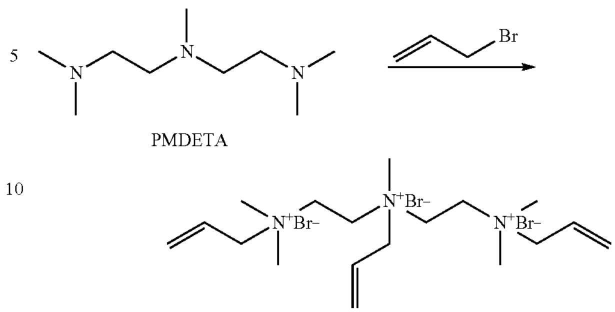

PMDETA

In one embodiment, the cationic organic polymer is derived from a quaternary organic salt, wherein the quaternary organic salt is a reaction product of a monomer containing two or more halogenated alkyl groups and a tertiary amine monomer containing an allyl group.

The monomer containing two or more halogenated alkyl groups is one or more selected from the group consisting of 1,3,5-tris(bromomethyl)benzene, 2,4,6-Tris(bromomethyl) mesitylene, 1,3,5-tris(bromomethyl)-2,4,6-triethylbenzene, 1,2,4,5-tetrakis(bromomethyl)benzene, hexakis(bromomethyl)benzene, 1,3-dibromo-2-(bromomethyl)-2-methylpropane, pentaerythrityl tetrabromide, 1,4-bis(2-bromomethyl) benzene, 4,4'-bis(bromomethyl)biphenyl, and difluoro-bis (alkyl bromide).

The 1,3,5-tris(bromomethyl)benzene may be represented by the structural formula of Formula 5, and the 2,4,6-tris (bromomethyl) mesitylene may be represented by the structural formula of Formula 6, the 1,3,5-tris(bromomethyl)-2,4,6-triethylbenzene may be represented by the structural formula of Formula 7, the 1,2,4,5-tetrakis(bromomethyl) benzene may be represented by the structural formula of Formula 8, the hexakis(bromomethyl)benzene may be represented by the structural formula of Formula 9, the 1,3-dibromo-2-(bromomethyl)-2-methylpropane) may be represented by the structural formula of Formula 10, the pentaerythrityl tetrabromide) may be represented by the structural formula of Formula 11, the 1,4-bis(2-bromomethyl)benzene may be represented by the structural formula of Formula 12, the 4,4'-bis(bromomethyl)biphenyl may be represented by the structural formula of Formula 13, and the difluoro-bis(alkyl bromide) may be represented by the structural formula of Formula 14.

[Formula 5]

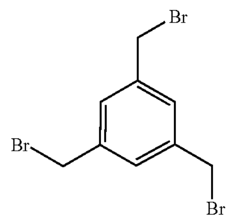

[Formula 6]

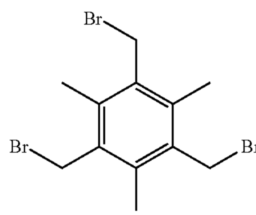

-continued

[Formula 7]

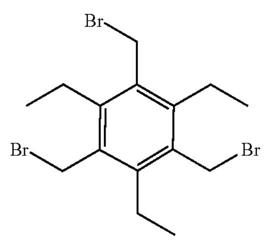

[Formula 8]

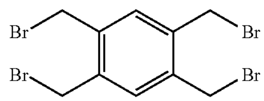

[Formula 9]

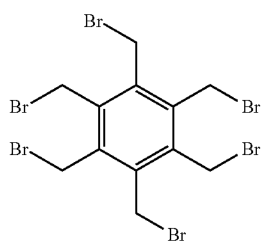

[Formula 10]

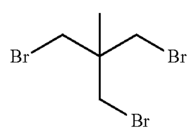

[Formula 11]

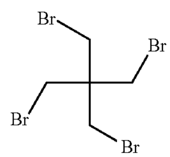

[Formula 12]

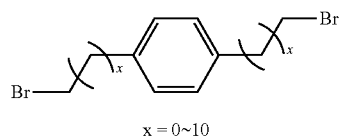

x = 0~10

[Formula 13]

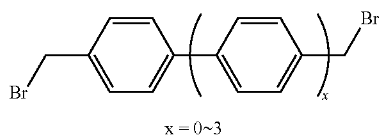

x = 0~3

[Formula 14]

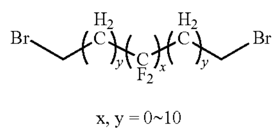

x, y = 0~10

Examples of the tertiary amine monomer containing the allyl group may include triallylamine represented by the structural formula of Formula 15 below, N,N-dimethylvinylbenzylamine represented by the structural formula of Formula 16 below, diallylmethylamine represented by the structural formula of Formula 17 below, and 1-vinylimidazole represented by the structural formula of Formula 18 below.

[Formula 15]

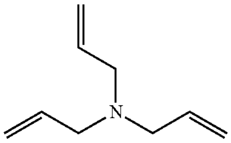

[Formula 16]

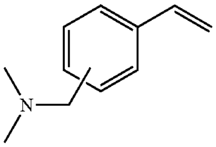

[Formula 17]

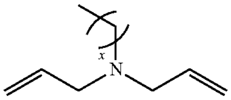

x = 0~10

[Formula 18]

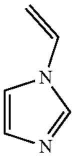

The reaction of the monomer containing two or more halogenated alkyl groups and the tertiary amine monomer containing an allyl group may be carried out through a process shown in Scheme 2 below.

[Scheme 2]

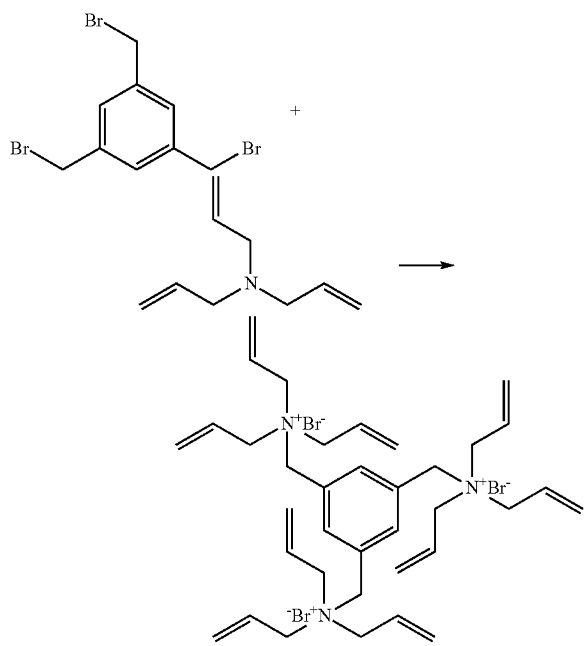

In one embodiment, the cationic organic polymer is derived from a tetraallyl compound monomer. The allyl group is a substituent including a double bond having a structural formula of $H_2C{=}CH{-}CH_2R$, and the tetraallyl compound monomer is crosslinked on the core through the double bond. In one embodiment, the type of the tetraallyl compound monomer is not limited as long as it is a quaternary organic salt containing the tetraallyl group. Examples of the quaternary organic salt containing the tetraallyl group may include tetraallyl sulfide, tetraallyl phosphonium and tetraallyl ammonium. In addition, the quaternary organic salt may be a halide. Examples of the halide may include fluoride compounds, chloride compounds, bromide compounds and iodine compounds.

In one embodiment, the tetraallyl compound monomer is one or more selected from the group consisting of N,N,N',N'-tetraallyl trimethylene dipiperidine dibromide (TAMPB), tetraallyl ammonium bromide (TAAB), bis-(diallylmethyl ammonium bromide)butane (DBP) and N,N,N',N'-tetraallyl piperazinium dibromide (TAPB).

In one embodiment, the ion exchange capability of the electrochemical catalyst according to the disclosure may be controlled according to at least one of the molecular weight and number of ion groups of the tetraallyl compound monomer.

The N,N,N',N'-tetraallyl trimethylene dipiperidine dibromide (TAMPB) may be represented by the structural formula of Formula 19 below, and have the exchange capacity (IEC) of 4.92.

[Formula 19]

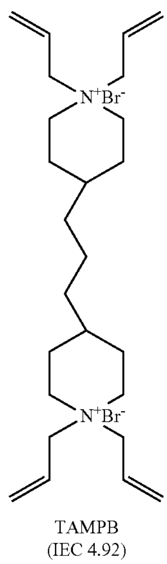

TAMPB
(IEC 4.92)

The tetraallyl ammonium bromide (TAAB) may be represented by the structural formula of Formula 20 below, and have the ion exchange capacity (IEC) of 5.12.

[Formula 20]

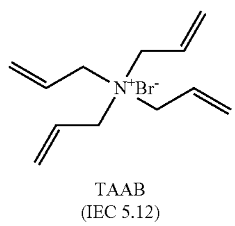

TAAB
(IEC 5.12)

The bis-(diallylmethyl ammonium bromide) butane (DBP) may be represented by the structural formula of Formula 21 below, and have the ion exchange capacity (IEC) of 6.70.

[Formula 21]

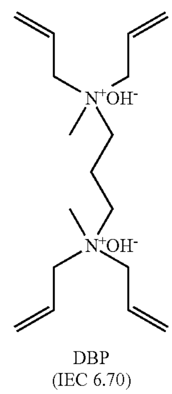

DBP
(IEC 6.70)

The N,N,N',N'-tetraallyl piperazinium dibromide (TAPB) may be represented by the structural formula of Formula 22 below, and have the ion exchange capacity (IEC) of 7.08.

[Formula 22]

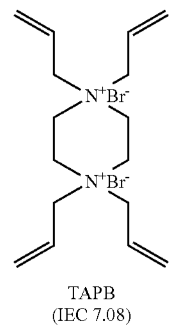

TAPB
(IEC 7.08)

In one embodiment, the tetraallyl compound monomer is crosslinked on the core. The present inventors completed the disclosure by finding that the ion exchange capability of the catalyst itself is improved by crosslinking a polymer having high ion exchange capability on a core comprising catalyst particles.

In one embodiment, the content ratio of the catalyst particles and the cationic organic polymer is 9:0.1 to 1 based on a weight. More specifically, the content ratio of the catalyst particles and the cationic organic polymer is 9:0.1 or more, 9:0.2 or more, 9:0.3 or more, 9:0.4 or more, 9:0.5 or more, 9:1 or less, 9:0.9 or less, 9:0.8 or less, 9:0.7 or less, 9:0.6 or less, 9:0.5 or less based on a weight, but is not limited thereto.

Hydrogen Electrode, Membrane Electrode Assembly, Water Electrolysis Device and Fuel Cell In another aspect, the disclosure provides a hydrogen electrode comprising the electrochemical catalyst.

In another aspect, the disclosure provides a membrane electrode assembly (MEA) comprising a cathode electrode comprising the electrochemical catalyst; an anode electrode positioned opposite to the cathode electrode; and an electrolyte membrane positioned between the cathode electrode and the anode electrode.

In another aspect, the disclosure provides a water electrolysis device comprising the membrane electrode assembly. The hydrogen energy produced by a water electrolysis device has advantages of high efficiency, abundant fuel (water), and no emission of pollutants such as nitrogen oxides (NOx) or sulfur oxides (SOx). Hydrogen can be produced by electrolysis of pure water or electrolysis of aqueous alkali solution.

In another aspect, the disclosure provides a fuel cell comprising the membrane electrode assembly. The fuel cell may be a polymer electrolyte membrane fuel cell (PEMFC). The polymer electrolyte membrane fuel cell is a device that converts chemical energy into electrical energy, and can utilize energy with higher efficiency than conventional internal combustion engines, and is a clean energy source that does not emit environmental pollutants such as carbon dioxide, nitrous oxide, and sulfur oxide during the energy conversion process.

Manufacturing Method of Electrochemical Catalyst

In another aspect, the disclosure provides a method for manufacturing the electrochemical catalyst, comprising the steps of mixing a catalyst particle, a monomer of an cationic organic polymer and a crosslinking agent to obtain a mixture; ultrasonicating the mixture to crosslink the cationic organic polymer on the catalyst particle; heat-treating and centrifuging the mixture to obtain an electrochemical catalyst precursor; and coating an ionomer on the electrochemical catalyst precursor to obtain an electrochemical catalyst.

In one embodiment, the centrifugation speed is 5000 to 15000 rpm, and the centrifugation time is 10 to 60 minutes. More specifically, the centrifugation speed may be 5000 rpm or more, 6000 rpm or more, 7000 rpm or more, 8000 rpm or more, 9000 rpm or more, 10000 rpm or more, 11000 rpm or more, 12000 rpm or more; 15000 rpm or less, 14000 rpm or less, 13000 rpm or less, 12000 rpm or less, but is not limited thereto. More specifically, the centrifugation time may be 10 minutes or more, 20 minutes or more, 30 minutes or more; 60 minutes or less, 50 minutes or less, 40 minutes or less, 30 minutes or less, but is not limited thereto.

Hereinafter, the disclosure will be described in detail with reference to preferred examples so that those skilled in the art can easily practice the disclosure. However, the disclosure may be embodied in many different forms, and is not limited to the examples described herein.

EXAMPLE

Figure 13:
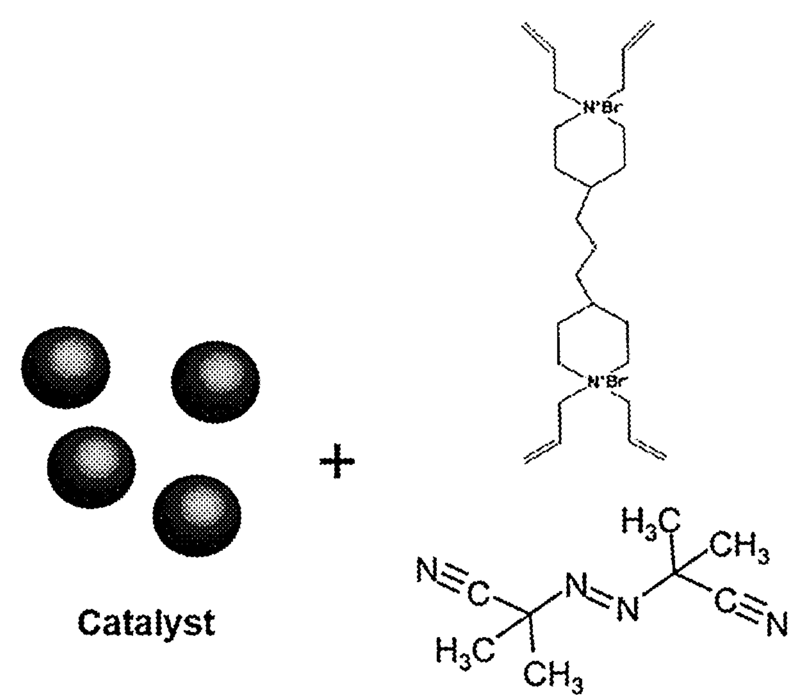
FIG. 13 is a scheme showing the process of obtaining a mixture according to an embodiment of the disclosure.

<Preparation Example 1> Preparation 1 of an Electrochemical Catalyst (Catalyst 1) According to the Disclosure According to Scheme 3-1 (FIG. 13), catalyst particles ($IrO_2$), N,N,N',N'-tetraallyl trimethylene dipiperidine dibromide (TAMPB) as monomers of cationic organic polymer, and N,N-azobisisobutyronitrile (AIBN) as a crosslinking agent were mixed to obtain a mixture.

Figure 14:
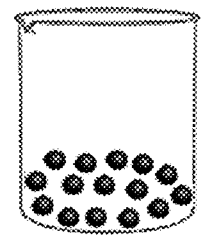
FIG. 14 is a scheme showing the process of obtaining an electrochemical catalyst precursor according to an embodiment of the disclosure.
Figure 14:
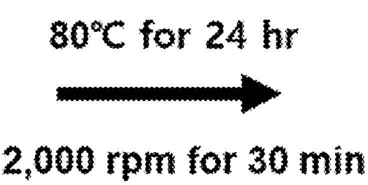
Figure 14:
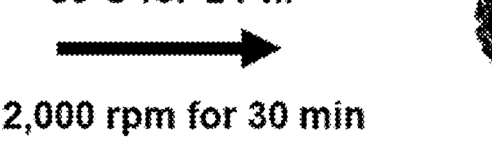
Figure 14:
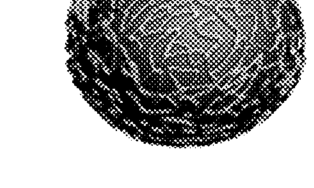

Subsequently, according to Scheme 4 (FIG. 14), the mixture was sonicated to crosslink the cationic organic polymer on the catalyst particles, and then the mixture was heat-treated at 80° C. for 24 hours and centrifuged at 12000 rpm for 30 minutes to obtain an electrochemical catalyst precursor.

Figure 15:
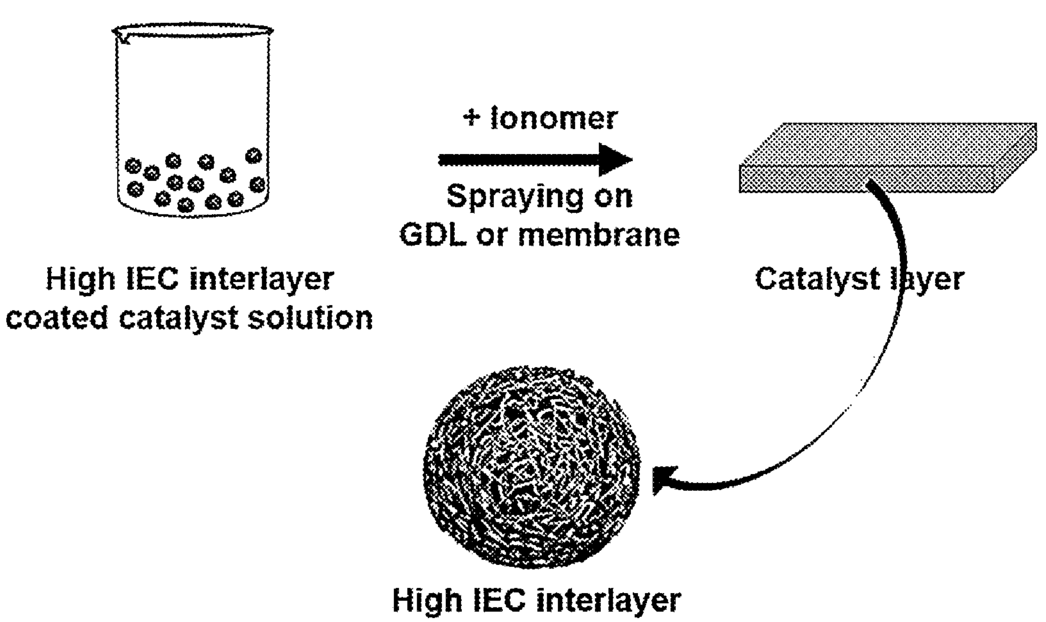
FIG. 15 is a scheme showing the process of obtaining a catalyst layer according to an embodiment of the disclosure.

Then, according to Scheme 5 (FIG. 15), an ionomer (TMA-70, see Scheme 6 below) was coated on the electrochemical catalyst precursor to obtain an electrochemical catalyst (catalyst 1) according to Example 1 of the disclosure. Then, the electrochemical catalyst was applied onto a membrane to obtain a catalyst layer.

Figure 9:
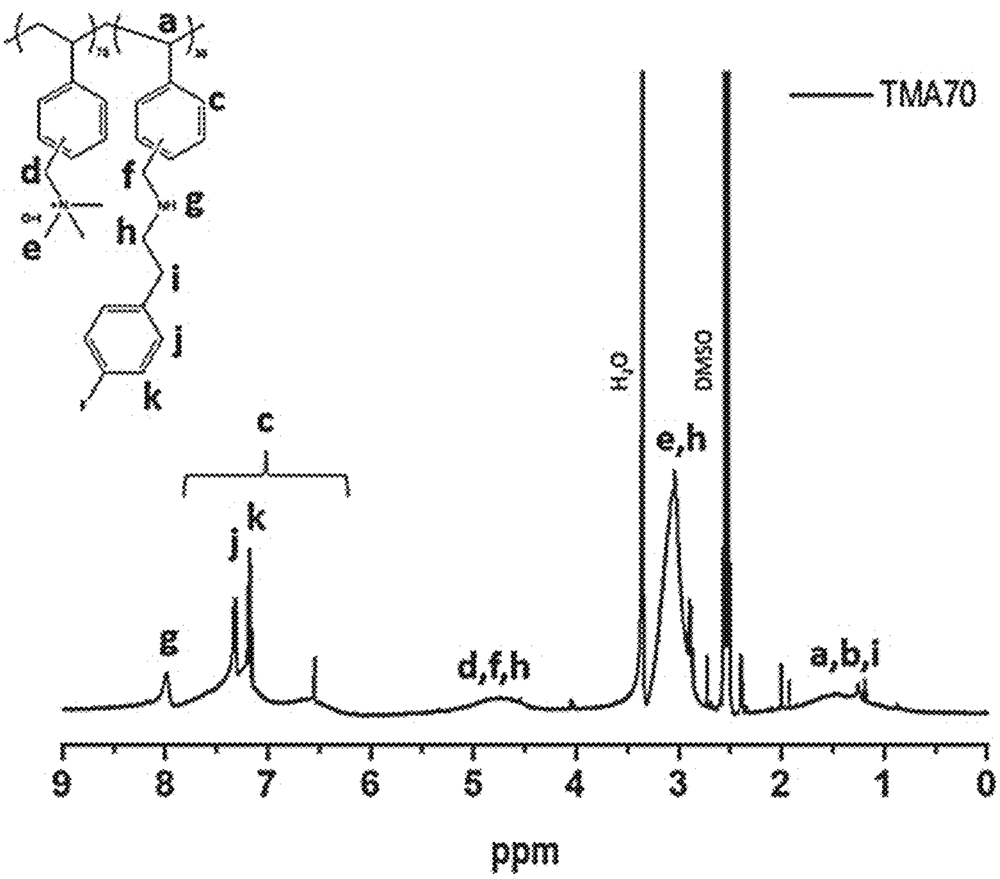
FIG. 9 is a graph showing the analysis results of $^1$H-NMR spectrum of an ionomer used in an electrochemical catalyst according to one embodiment of the disclosure.

The ionomer (TMA-70) used was synthesized using polyvinylbenzyl chloride (PVBC) according to Scheme 6 below. More specifically, by introducing 70% of the trimethylamine group and 30% of the 2-(-4-fluorophenyl)ethylamine group into the benzyl chloride functional group, TMA-70 was obtained. The structure of the ionomer (TMA-70) was analyzed through $^1$H-NMR spectrum. The results were shown in FIG. 9. FIG. 9 is a graph showing the results of $^1$H-NMR spectrum analysis of the ionomer used in electrochemical catalyst according to one embodiment of the disclosure.

[Scheme 6]

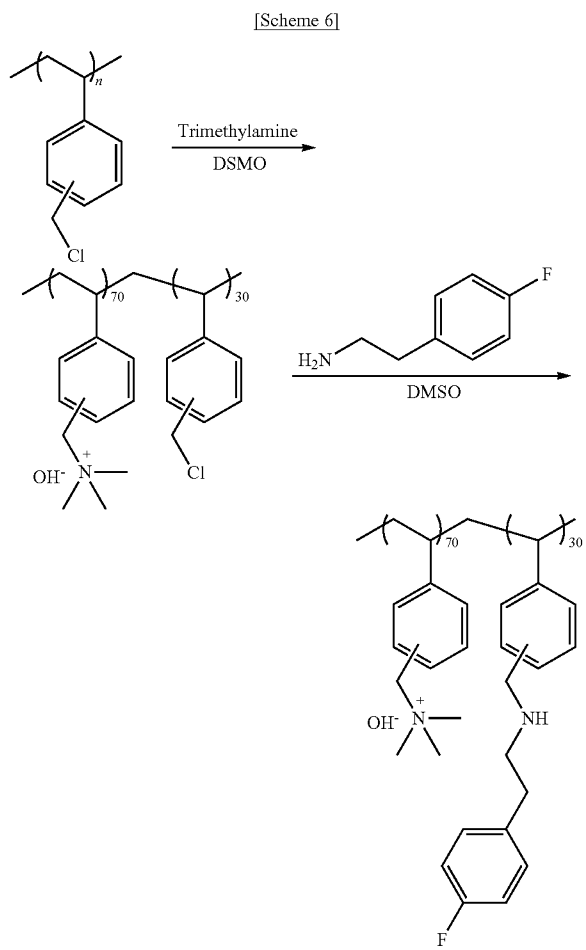

Figure 16:
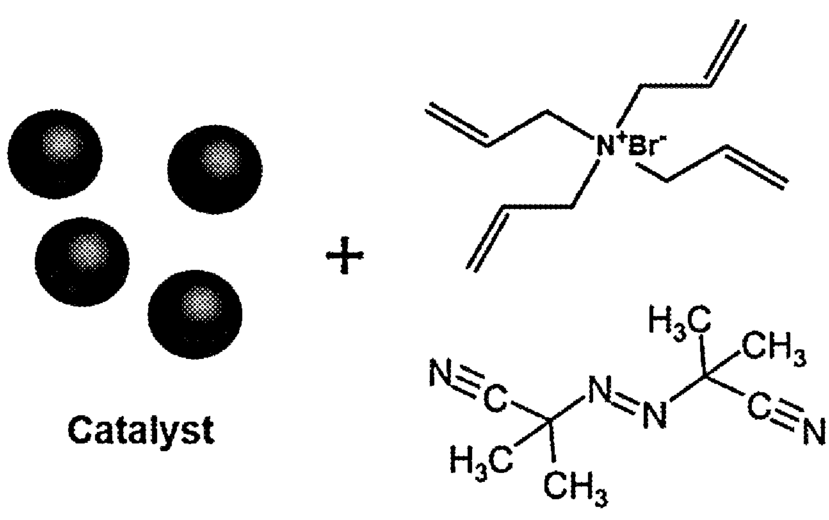
FIG. 16 is a scheme showing the process of obtaining a catalyst layer according to an embodiment of the disclosure.

<Preparation Example 2> Preparation 2 of an Electrochemical Catalyst According to the Disclosure The electrochemical catalyst according to Example 2 (Catalyst 2) of the disclosure and a catalyst layer comprising the catalyst were obtained in the same manner as in Preparation Example 1, except for using tetraallyl ammonium bromide (TAAB) as the monomer of the cationic organic polymer according to Scheme 3-2 (FIG. 16).

<Preparation Example 3> Preparation 3 of an Electrochemical Catalyst According to the Disclosure The electrochemical catalyst according to Example 3 (Catalyst 3) of the disclosure and a catalyst layer comprising the catalyst were obtained in the same manner as in Preparation Example 1, except for using the reaction product of the diallylamine-based monomer and tetraallyl ammonium bromide (TAAB) as the monomer of the cationic organic polymer according to Scheme 3-3 below.

[Scheme 3-3]

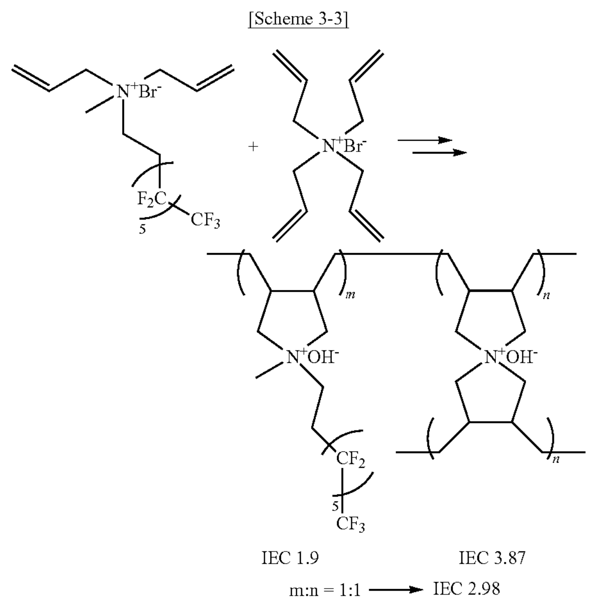

Meanwhile, an example of the diallylamine-based monomer may include diallyalkylamine represented by the structural formula of Formula 23 below.

[Formula 23]

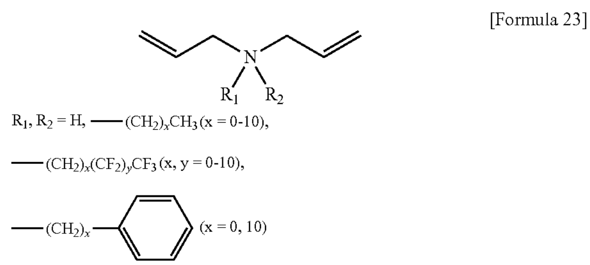

<Experimental Example 1> Structural Analysis 1 of Organic Polymeric Monomers Used in an Electrochemical Catalyst The structure of the organic polymer monomers used in the electrochemical catalyst according to the disclosure was analyzed through $^1$H-NMR spectrum. The results were shown in FIGS. 1 to 4. FIGS. 1 to 4 are graphs showing the analysis results of $^1$H-NMR spectrum of organic polymer monomers used in an electrochemical catalyst according to one embodiment of the disclosure.

From FIGS. 1 to 4, it was confirmed that all four cationic network polymer precursors (CNPPs) were synthesized well, and the CNPP according to the disclosure has an ionic group and a double bond. From this, it can be expected that crosslinking is possible through a double bond.

<Experimental Example 2> Structural Analysis 2 of Organic Polymeric Monomers Used in an Electrochemical Catalyst The structures before and after crosslinking of the organic polymer monomers used in the electrochemical catalyst according to the disclosure were analyzed through FT-IR. FIGS. 5 to 8 are graphs showing FT-IR analysis results before and after crosslinking of organic polymer monomers used in an electrochemical catalyst according to one embodiment of the disclosure.

From FIGS. 5 to 8, it can be seen that the peak at 3080 $cm^{-1}$ indicating a double bond disappeared after crosslinking of the CNPP.

<Experimental Example 3> Surface Analysis of an Electrochemical Catalyst

Figure 10:
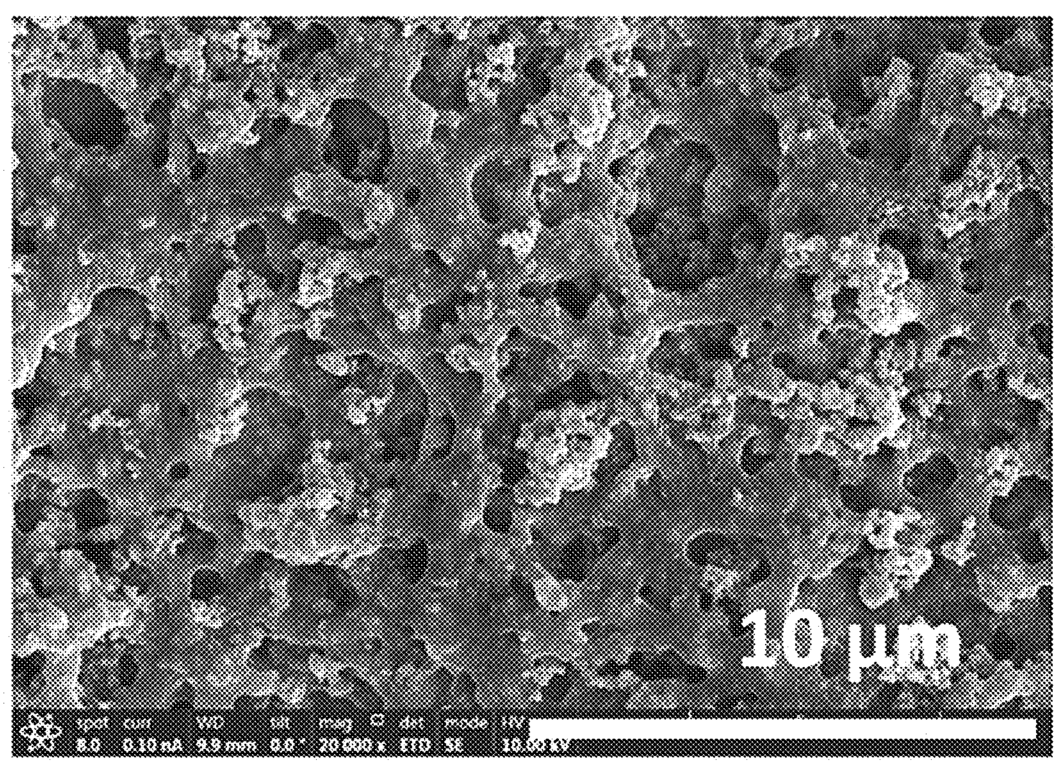
FIG. 10 is a SEM image of an electrochemical catalyst according to one embodiment of the disclosure.

The surface of the electrochemical catalyst according to Example 1 prepared in Preparation Example 1 was measured using a scanning electron microscope (SEM, FEI Inspect F50, Thermo-Fisher Scientific). The results were shown in FIG. 10. FIG. 10 is a SEM image of an electrochemical catalyst according to one embodiment of the disclosure. From FIG. 10, it can be seen that the cationic organic polymer was crosslinked and the ionomer was coated on the core comprising the catalyst particles.

Figure 11:
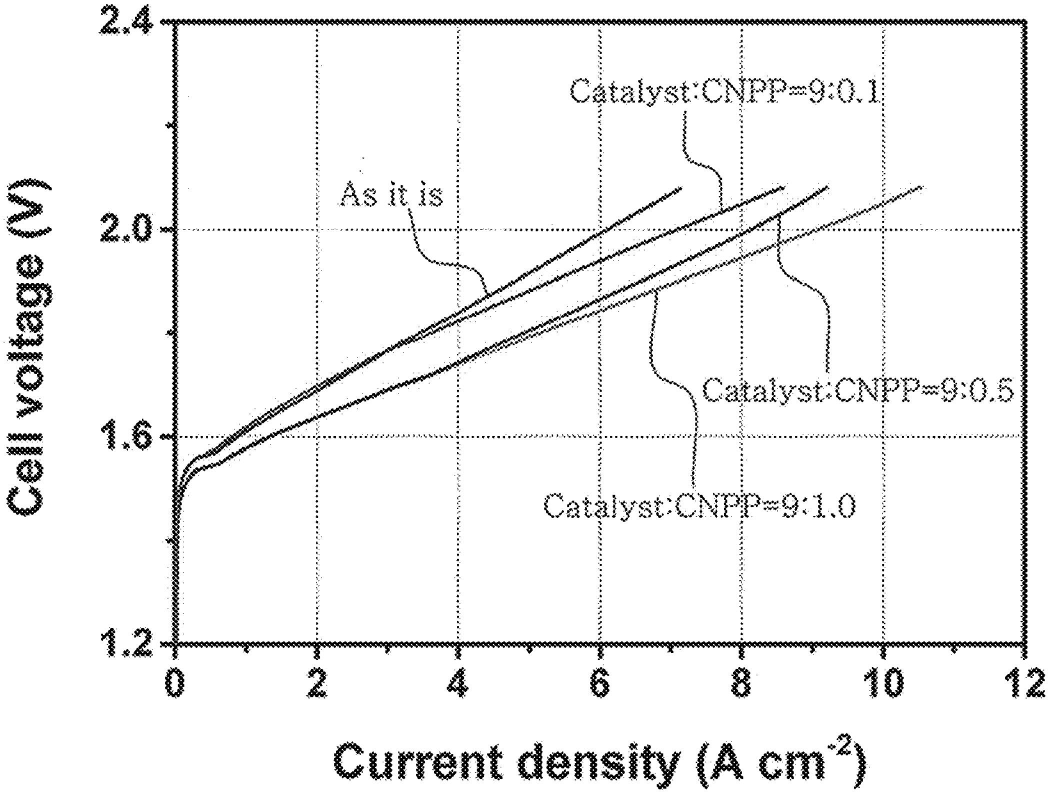
FIG. 11 is a graph showing an I-V curve of an electrochemical catalyst according to one embodiment of the disclosure.

<Experimental Example 4> Electrochemical Characteristics Evaluation 1 of an Electrochemical Catalyst The electrochemical properties of a two-electrode system comprising the electrochemical catalyst according to Example 1 prepared in Preparation Example 1 as a working electrode were evaluated. More specifically, the electrochemical properties were evaluated by setting the content ratios of the catalyst particles and the cationic organic polymer to 9:0.1, 9:0.5, and 9:1, respectively, based on a weight. For comparison, catalyst particles on which crosslinking or coating was not conducted were prepared. The results were shown in FIG. 11. FIG. 11 is a graph showing an I-V curve of an electrochemical catalyst according to one embodiment of the disclosure.

From FIG. 11, it can be confirmed that the performance of the two-electrode system is improved by about 40% or more compared to the existing catalyst. Accordingly, in alkaline water electrolysis using a non-noble metal catalyst, the clogging phenomenon of reactant supply is solved in the high voltage section where mass transfer is restricted, and thus, it can be expected that the performance of the catalyst can be maximized. In addition, when the content ratio of the catalyst particles and the cationic organic polymer was controlled, the performances of all the catalysts were improved compared to the conventional catalyst. Through this, an improvement effect of 40% or more can be expected through optimization of the content ratio of the catalyst particles and the cationic organic polymer.

<Experimental Example 5> Evaluation of Electrochemical Properties of an Electrochemical Catalyst 2

Figure 12:
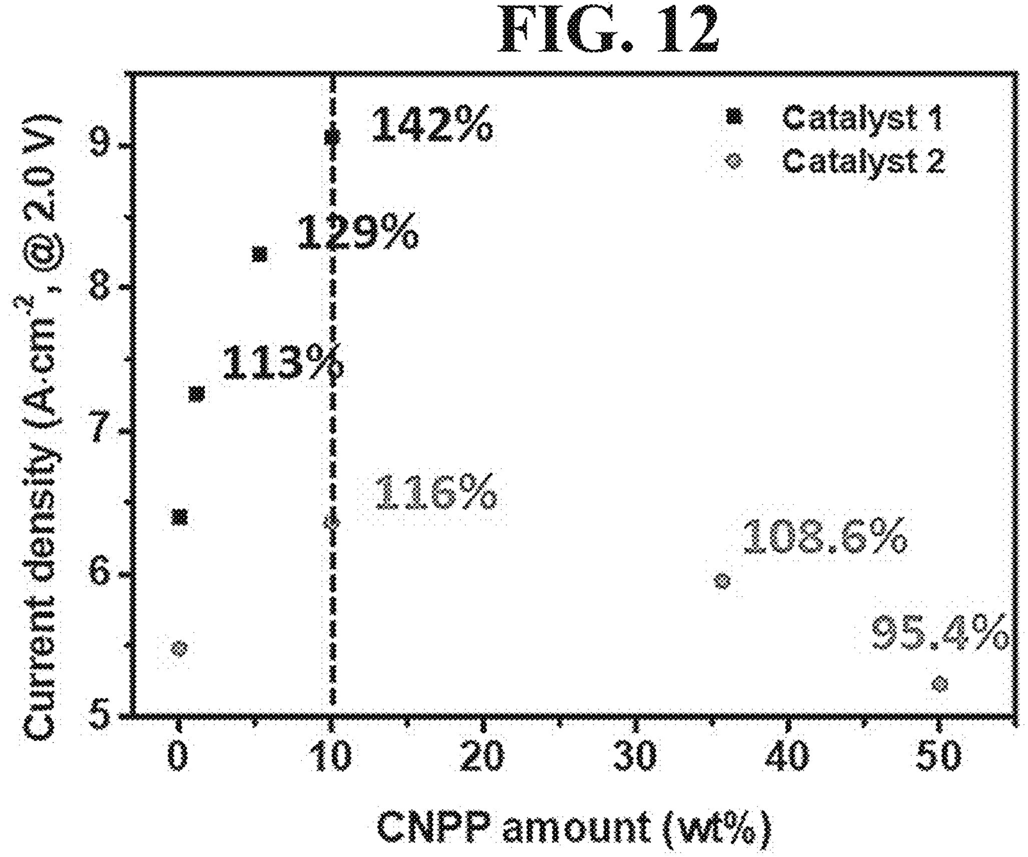
FIG. 12 is a graph showing a performance of an electrochemical catalyst according to one embodiment of the disclosure.

Electrochemical properties were evaluated using the same method as in Experimental Example 4. More specifically, the electrochemical properties of a catalyst layer comprising the electrochemical catalyst (catalyst 1) according to Example 1 of the disclosure in which the cationic organic polymer content is 0, 1, 5, and 10 wt %, respectively, and the electrochemical catalyst (catalyst 2) according to Example 2 of the disclosure in which the cationic organic polymer content is 0, 10, 36 and 50 wt %, respectively, were evaluated. The results were shown in FIG. 12. FIG. 12 is a graph showing a performance of an electrochemical catalyst according to one embodiment of the disclosure.

From FIG. 12, it can be confirmed that the performance is excellent in the high voltage section where mass transfer is restricted around the point where the content ratio of the catalyst particles and the cationic organic polymer is 9:1.

Although exemplary embodiments of the disclosure have been described above in relation to the above-mentioned preferred examples, various modifications and variations can be made without departing from the spirit and scope of the disclosure. Therefore, the appended claims contain such modifications or variations as fall within the true spirit of the disclosure.

What is claimed is:

1. An electrochemical catalyst comprising:

a core comprising a catalyst particle;

a first shell comprising a cationic organic polymer coated on the core; and a second shell comprising an ionomer coated on the first shell, wherein the cationic organic polymer is a nitrogen-containing organic polymer.

2. The electrochemical catalyst of claim 1, wherein the cationic organic polymer is derived from a quaternary organic salt, the quaternary organic salt is a reaction product of a monomer containing two or more tertiary amine groups and a halide containing an allyl group.

3. The electrochemical catalyst of claim 1, wherein the cationic organic polymer is derived from a quaternary organic salt, the quaternary organic salt is a reaction product of a monomer containing two or more halogenated alkyl groups and a tertiary amine monomer containing an allyl group.

4. The electrochemical catalyst of claim 1, wherein the cationic organic polymer is derived from a tetraallyl compound monomer.

5. The electrochemical catalyst of claim 4, wherein the tetraallyl compound monomer is one or more selected from the group consisting of N,N,N',N'-tetraallyl trimethylene dipiperidine dibromide (TAMPB), tetraallyl ammonium bromide (TAAB), bis-(diallylmethyl ammonium bromide) butane (DBP), and N,N,N',N'-tetraallyl piperazinium dibromide (TAPB).

6. The electrochemical catalyst of claim 1, wherein the cationic organic polymer is crosslinked on the core.

7. The electrochemical catalyst of claim 1, wherein a content ratio of the catalyst particle and the cationic organic polymer is 9:0.1 to 1 based on a weight.

8. A hydrogen electrode comprising the electrochemical catalyst of claim 1.

9. A membrane electrode assembly comprising:

a cathode electrode comprising the electrochemical catalyst of claim 1;

an anode electrode positioned opposite to the cathode electrode; and an electrolyte membrane positioned between the cathode electrode and the anode electrode.

10. A water electrolysis device comprising the membrane electrode assembly of claim 9.

11. A fuel cell comprising the membrane electrode assembly of claim 9.

* * * * *